United States Patent [19]

Date et al.

[11] Patent Number: 4,715,490
[45] Date of Patent: Dec. 29, 1987

[54] AUTOMATIC PALLET CHANGER

[75] Inventors: Takao Date, Kannami; Masaru Okumura; Koya Watanabe, both of Numazu, all of Japan

[73] Assignee: Toshiba Kikai Kabushiki Kaisha, Chuo, Japan

[21] Appl. No.: 853,917

[22] Filed: Apr. 21, 1986

[30] Foreign Application Priority Data

Apr. 26, 1985 [JP] Japan .................................. 60-88965

[51] Int. Cl.⁴ ............................................ B65G 47/00
[52] U.S. Cl. ................................. 198/346.1; 29/33 P; 29/563
[58] Field of Search ...................... 198/346.1; 29/33 P, 29/563

[56] References Cited

U.S. PATENT DOCUMENTS 3,807,035 4/1974 Moorman et al. ...................... 29/563
4,172,512 10/1979 Clegg et al. ...................... 29/33 P X
4,449,277 5/1984 Hasegawa et al. .......... 198/346.1 X

FOREIGN PATENT DOCUMENTS 158781 12/1979 Japan ..................................... 29/563
9153 1/1981 Japan ..................................... 29/33 P Primary Examiner—Richard J. Scanlan, Jr.
Attorney, Agent, or Firm—Stevens, Davis, Miller & Mosher

[57] ABSTRACT

An automatic pallet changer for replacement of pallets automatically between a pallet magazine storing a plurality of pallets and a pallet table of a machine tool which comprises a rack fixed on the rear of each pallet, a pallet driving pinion engaging with the rack disposed on a side end of the pallet table and a pinion driving apparatus. The pinion is driven to rotate and the rack is moved linearly whereby the pallet is transferred to and from the table of machine tool.

3 Claims, 4 Drawing Figures

AUTOMATIC PALLET CHANGER

BACKGROUND OF THE INVENTION

1. Field of the Invention

The present invention relates to an automatic pallet changer, and more particularly concerns an automatic pallet changer whereon a relatively large-sized pallet can be replaced quickly between a pallet table of a machine tool and a pallet magazine storing a number of pallets.

2. Description of the Prior Art

To cope with requirements for automating workshops, there has been developed and is practiced, a system wherein work is placed and fixed on pallets beforehand, and the pallets are fed in sequence to the machine tool.

Where the machine tool is very large, such as a planomiller or the like, the work and the pallet carrying the work are also large in size, and, as compared with an automatic pallet changer (hereinafter called "APC") used for general machine tools, the large-sized tool's APC must have the following points taken into consideration. That is, a work and a pallet being extremely heavy, the driving mechanism must be sufficiently strong to ensure both mechanical strength and driving force. Further, a long-sized pallet entails a prolonged shift stroke, however, as much as possible, accuracy and quickness of replacement should be taken into consideration.

SUMMARY OF THE INVENTION

It is accordingly an object of the present invention to provide an automatic pallet changer capable of replacing a relatively large-sized pallet quickly and accurately.

In an automatic pallet changer for replacement of pallets, each having an upper surface and a lower or rear surface, automatically between a pallet magazine on which a plurality of pallets are stored, and a pallet table of a machine tool, the invention is characterized by a rack fixed on the rear of the pallet parallel to the direction in which the pallet is shifted for the replacement, a pallet driving pinion which engages with the rack disposed on a side end of the pallet table facing the pallet magazine, and pinion driving apparatus for driving the pallet driving pinion.

According to the invention, the pinion is driven to rotate and the rack is moved linearly whereby the pallet is transferred to and from the table of machine tool. The pallet driving pinion engages with and disengages from the rack by a horizontal move of a pallet placing table of the pallet magazine, and a pallet shift operation can be commenced quickly without an unnecessary operation. Further, since the pallet is ready for shifting by a pinion driving mechanism as soon as the pinion and rack are engaged, even a relatively large and heavy pallet can be shifted quickly and accurately.

DETAILED DESCRIPTION OF THE INVENTION

The invention will now be described in its preferred embodiment with reference to the accompanying drawings.

Figure 1:
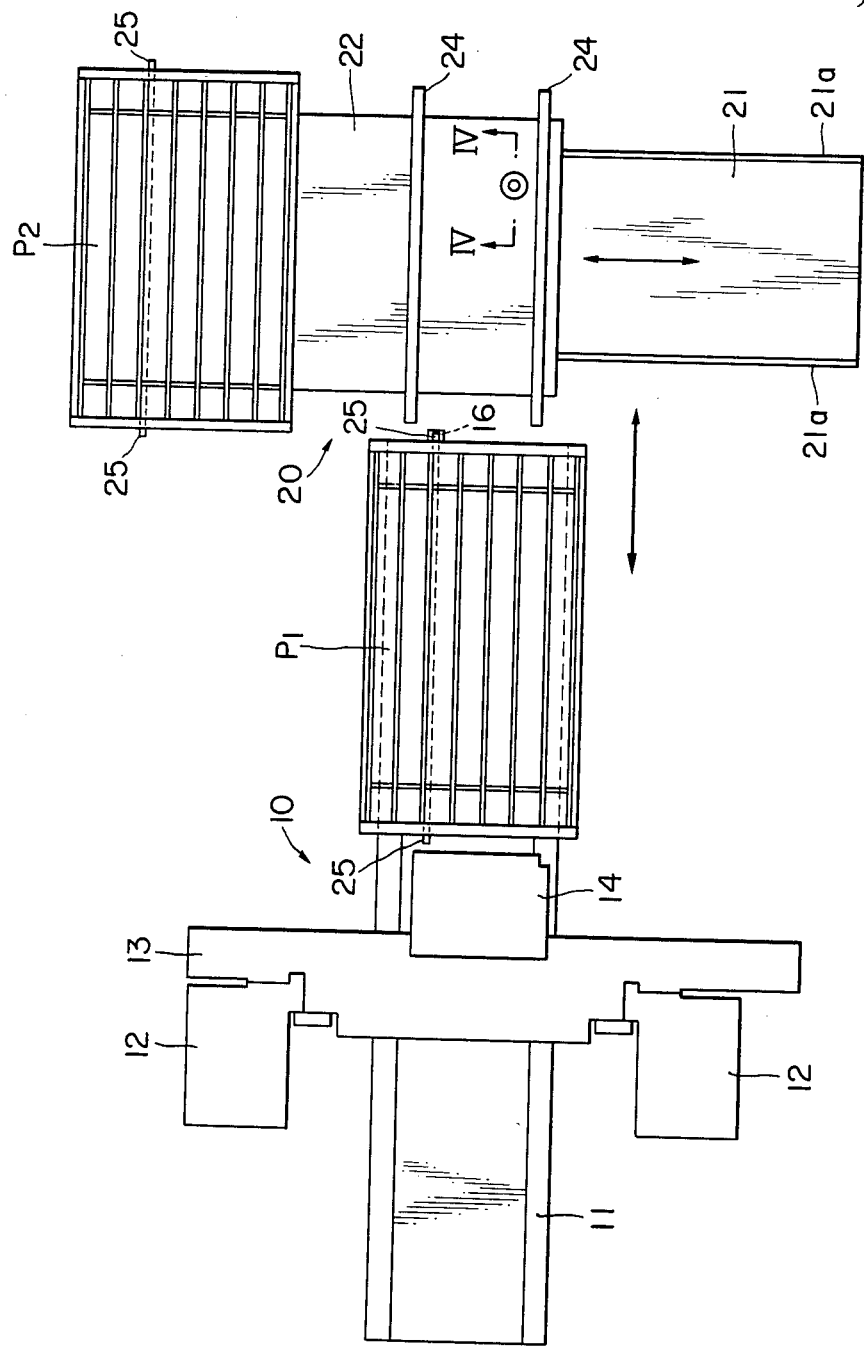
FIG. 1 and FIG. 2 are a plan view and a side view representing one example of an automatic pallet changer according to the invention.
Figure 2:
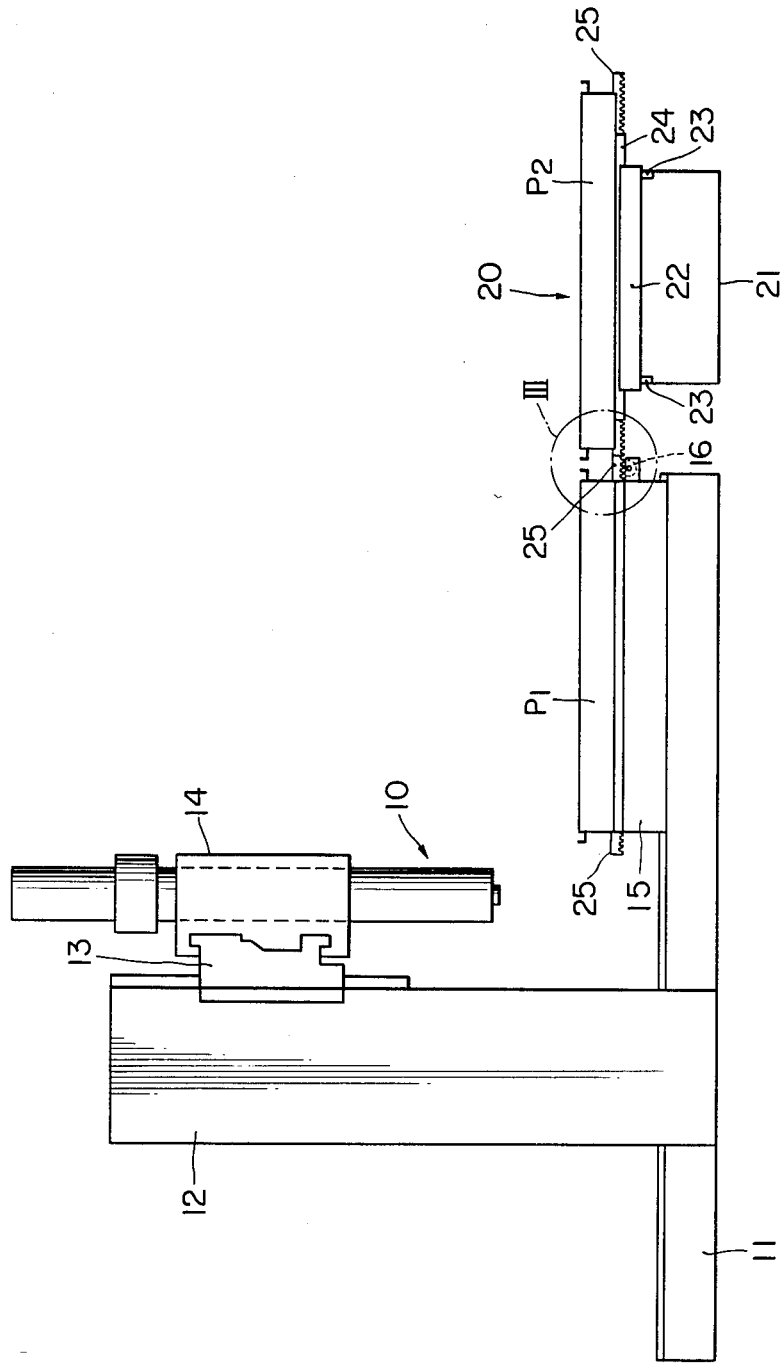

FIG. 1 and FIG. 2 are a plan view and a side view representing an example where the automatic pallet changer (APC) according to the invention is applied to a double housing planomiller. In these figures, reference numeral 11 denotes the bed of a planomiller 10. A pair of vertical columns 12 are provided on both sides of the bed 11, and a cross rail 13, movable up and down on the vertical clumns 12, is installed. Further a spindle head 14, movable horizontally on the cross rail, is installed. A pallet table 15 is placed horizontally slidable on the upper surface of the bed 11.

Figure 3:
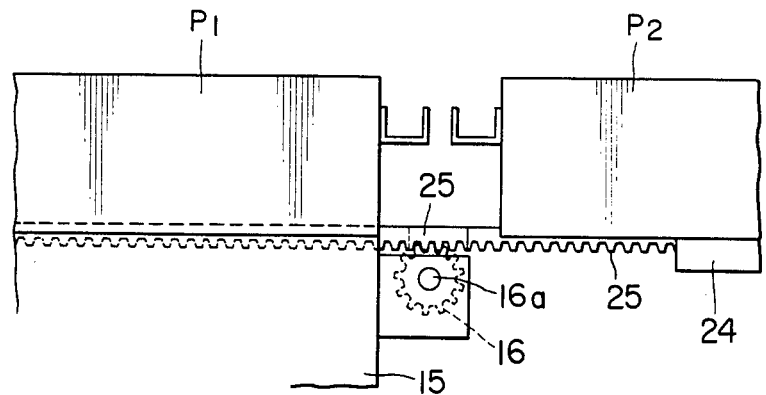
FIG. 3 is a fragmentary enlarged view of a portion indicated by a reference character III in FIG. 2.

A pair of guide rails (not shown) are provided on the upper surface of the pallet table 15, and pallets P1, P2 are slidable horizontally along the guide rails. A pallet driving pinion 16 is located on a front end portion (right end portion in FIGS. 1 and 2) of the pallet table 15. As shown in FIG. 3, the pallet driving pinion 16 is constituted by a spur gear, and has a rotating shaft 16a held orthogonally rotatable to the guide rails (not shown) on the pallet table 15 so that an intermeshing pitch circle will come to a position within a vertical plane parallel with the guide rails. Further, as shown in FIG. 3, the pinion 16 is located so that the height of the toothed part facing upward will be near the pallet sliding surface of the pallet table 15.

A pallet magazine 20 for storing a plurality of pallets thereon is disposed ahead (right side in FIGS. 1 and 2) of the bed 11 at a predetermined interval. The pallet magazine 20 is provided with a stationary base 21 fixed on the floor, and a pallet placing table 22 sliding on the stationary base 21 in the direction orthogonal to that in which a pallet on the pallet table 15 of the planomiller 10 slides. A pair of guide rollers 23 mounted on the lower surface of the pallet placing table 22 rotate to move on a guide groove 21a formed on the upper outside surfaces of both sides of the stationary base 21. A pair of guide rails 24 are disposed on the upper surface of the pallet placing table 22 in a number sufficient to accept the number of the pallets placed thereon (two pallets are placed in the present embodiment) in parallel with the guide rails (not shown) on the pallet table 15.

Each rack 25 is fixed on the rear of pallets P1, P2 parallel to the direction in which the pallets slide, and with both ends extending outwardly past the end portions of the pallets P1, P2.

Figure 4:
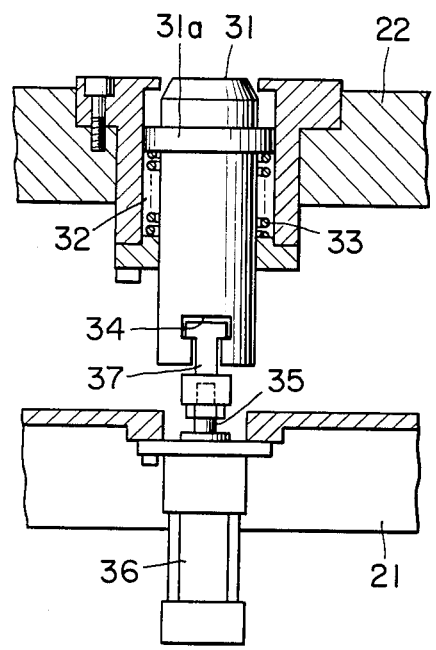
FIG. 4 is an enlarged sectional view taken on line IV—IV of FIG. 1.

FIG. 4 is a fragmentary enlarged sectional view representing one example of a pallet holding mechanism provided on the pallet placing table 22. In this figure, a reference numeral 31 denotes a locating shaft having its nose (upper end) portion inserted in a locating hole (not shown) formed on the rear of the pallet, and such locating shaft 31 is energized upward from the pallet placing table 22 by a flange part 31a positioned partway up the length thereof coming in contact with a spring 33 enclosed in a through hole 32 of the pallet placing table 22. A groove 34, T-shaped in section (hereinafter called "T-groove"), which penetrates in the direction orthogonal to the axis, is formed in a lower end of the locating shaft 31.

With a piston rod 35 protruded upwardly from the upper surface of the stationary base 21, a hydraulic cylinder 36 is fixed at a pallet replacing position (whereat the guide rails 24 are matched with guide rails on the pallet table 15) of the stationary base 21, and a T-shaped member 37 inserted horizontally and so engaged with the T-groove 34 is mounted on an upper end of the piston rod 35.

The operation of the embodiment of the invention constituted as above will be described next.

As shown in FIG. 1, for replacing the pallet P1 placed on the pallet table 15 of the planomiller 10 with the pallet P2 placed on the pallet placing table 22 of the pallet magazine 20, first the pallet placing table 22 is moved horizontally on the stationary base 21, and the guide rails 24 on the side where the pallet is not placed, are positioned on an extension of the guide rails (not shown) on the pallet table 15 (FIG. 1).

Next, the rack 25 is engaged with the pinion 16, the pinion 16 is driven to rotate, and the rack 25 is moved linearly, and thus the pallet P1 is transferred onto the guide rails 24 on a side of the pallet magazine 20.

The pallet holding mechanism shown in FIG. 4 is actuated after the pallet P1 is transferred onto the guide rails 24, and the pallet is locked or unlocked as follows. First, in the state shown in FIG. 4, the locating shaft 31 has the T-groove 34 on its lower end engaged with the T-shaped member 37, and as the T-shaped member 37 is pulled downward by the hydraulic cylinder 36, it is lowered to a position where it is disengaged from the locating hole of the pallet. Then, the pallet P1 is transfered onto the guide rails 24, the hydraulic cylinder 36 is actuated to move the piston rod 35 upward, a nose portion of the locating shaft 31 is inserted in the locating hole of the pallet P1, and thus the pallet P1 is fixed on the pallet placing table 22.

As the pallet placing table 22 is moved horizontally (downward in FIG. 1) together with the pallet P1, the T-shaped member 37 is disengaged from the T-groove. However, the locating shaft 31 continues to be held upward by the spring 33, and thus the pallet P1 is held in a fixed position on the pallet placing table 22. Further, when the pallet placing table 22 is moved horizontally and the pallet P2 is shifted to the pallet replacing position, the T-groove 34 is inserted horizontally and automatically engages with the T-shaped member 37, since the hydraulic cylinder 36 is still in the "up" position. Then, as the T-shaped member 37 is pulled downward by the hydraulic cylinder 36, the locating shaft 31 is pulled out of the locating hole, and the pallet P2 is unlocked. Thus the pallet P2 is ready for shifting from the pallet placing table 22.

When the pallet P2 is shifted to the pallet replacing position, a nose of the rack 25 fixed on the rear of the pallet P2 is engaged horizontally with the pinion 16 provided on a nose of the pallet table 15. Next, the pinion 16 is driven to rotate, the pallet P2 is moved to a side of the pallet table 15 along the guide rails 24 together with the rack 25, and then placed on the guide rails of the pallet table 15. The pallet P2 is positioned and locked on the pallet table 15 by a clamp (not shown) provided on the pallet table 15.

By the series of operations described above, the pallet P1 on the planomiller 10 is transferred onto the pallet magazine 20, and the pallet P2 on the pallet magazine 20 is transferred onto the planomiller 10.

As described above, according to the embodiment of the invention, pallets are transferred by a driving mechanism of the pinion 16 and the rack 25, and therefore a large-sized, heavy pallet and a work placed thereon can be transferred quickly and accurately as compared with a driving mechanism using hydraulic cylinder, chain or the like. Further, since the pinion 16 and the rack 25 are engaged or disengaged by horizontal movement of the pallet placing table 22, the structure is simplified and the operation is accomplished quickly.

Still further, the pallets P1, P2 can be located by a horizontal move of the pallet placing table 22, therefore the holding mechanism is simplified and the operation for positioning can be performed quickly. Further, as the pinion 16 is driven by a servomotor, a shift stroke of the pallet can be controlled easily, and also its alteration and adjustment will be simple to make.

In the present embodiment, an example where the two pallets P1, P2 are replaced is represented, however, it can be applied likewise to an example where more than two pallets are replaced. Although this example represents a case where both ends of the rack 25 extend past the end surfaces of the pallet, the extension of the rack 25 is not necessarily requisite. Further, the pinion 16 can be disposed at a position rearward of a front end of the pallet table 15 (or inside of the pallet table 15). That is, a positional relation between the pinion 16 and the rack 25 will be subject to the conditions that the rack 25 of a pallet can be engaged with the pinion 16 when the pallet is moved horizontally to the pallet replacing position and that a stroke capable of transferring the pallet from one set of guide rails to the other set of guide rails perfectly will be possible when the pallet is transferred by the pinion 16. In that case, multiple pallet driving pinions may be disposed.

What is claimed is:

1. An automatic pallet changer for replacement of pallets automatically between a pallet magazine storing a plurality of pallets and a pallet table of a machine tool, said pallet changer comprising:
   a rack fixed on the rear of each pallet parallelly to the direction in which the pallet is shifted for said replacement;
   a pallet driving pinion engaging with said rack disposed on a side end of said pallet table facing the pallet magazine; and
   pinion driving means for driving said pallet driving pinion.

2. An automatic pallet changer as claimed in claim 1 wherein the pallet magazine is provided with a pallet placing table movable in a horizontal direction perpendicular to the direction in which the pallet is shifted.

3. An automatic pallet changer as claimed in claim 1 wherein the pallet magazine is provided with pallet holding means for holding the pallet in a fixed position on the pallet magazine.

* * * * *